United States Patent [19]

LoCodo

[11] 4,264,262
[45] Apr. 28, 1981

[54] TOW TRUCK

[76] Inventor: James M. LoCodo, 2810 Bowlin Ave., San Ramon, Calif. 94583

[21] Appl. No.: 20,948

[22] Filed: Mar. 16, 1979

[51] Int. Cl.³ .............................................. B60P 3/12
[52] U.S. Cl. .................................... 414/563; 280/402
[58] Field of Search ...................... 414/563, 718, 728; 296/2; 280/402, 482, 478 R, 478 A, 478 B, 479 R, 479 A, 790, 638, 635

[56] References Cited

U.S. PATENT DOCUMENTS

| | | | |
|---|---|---|---|
| 3,387,853 | 6/1968 | Sueoka | 296/168 |
| 3,534,874 | 10/1970 | Long | 414/563 |
| 3,908,842 | 9/1975 | Place | 414/563 |
| 4,000,823 | 1/1977 | Aquila | 280/402 |

OTHER PUBLICATIONS

Fenton 16-Ton Wrecker.
Bro P100 Wrecker.
Vulcan 4 Ton Cradle Snatcher.

*Primary Examiner*—Stephen G. Kunin
*Assistant Examiner*—L. E. Williams
*Attorney, Agent, or Firm*—Phillips, Moore, Weissenberger, Lempio & Majestic

[57] ABSTRACT

An improved tow truck is provided which comprises a boom pivotally lowerable and raiseable between the truck frame. The boom is telescopic with a rearward end which is extendible, and when fully lowered and extended the rearward end is adjacent the ground and may lift a load, such as a disabled vehicle, about the vehicle wheels. The boom may be retracted and raised to bring the lifted load close to the rear axle of the tow truck.

7 Claims, 4 Drawing Figures

TOW TRUCK

BACKGROUND OF THE INVENTION

1. Field of the Invention

The present invention relates to tow trucks, particularly to an improved boom for such trucks.

2. Prior Art

A variety of tow trucks are known for towing disabled vehicles such as passenger cars or trucks. Specialized tow trucks are commercially popular. Multi-purpose flat bed trucks, which may be adapted for temporary towing purposes, are also known.

Specialized towing trucks are those which have generally met with the most commercial success. The specialized trucks normally include an overhead boom from which depends a sling or cradle attachable to the stalled vehicle for lifting and towing thereof. Stability of the lifted load is aided by a tow bar which extends rearwardly of the tow truck frame and which defines a fixed minimum distance of the lifted load from the tow truck.

The sling lifted tow trucks have been very popular in this country; however, attachment of the tow bar and sling to the vehicle frame or suspension is a dirty task, and as the lifting point of the disabled vehicle is near its front or rear bumper, damage such as denting or twisting to vehicle components is a frequent occurrence. Such damage has been increasing as more plastic parts and shock-collapsible bumpers have been incorporated into passenger cars.

Those tow trucks which utilize a cradle usually attach to the front or rear wheels of the vehicle to be towed. However, where the lifting point is about the wheels of the load (a wheel-lift), the tow truck carries a much higher portion of the towed vehicle's weight than when the lifting point is adjacent the towed vehicle bumper. Thus, although the wheel-lift tow trucks provide relatively clean attachment and greatly reduce the chances of damage to the towed vehicle, instability of the towed load in transit during acceleration and deceleration and instability of the towing truck due to longitudinal tire load transfer have been problems.

Among the multi-purpose flat bed trucks adapted for towing purposes are those disclosed by U.S. Pat. Nos. 4,000,823 and 3,908,842. The structure taught by these patents include the potential for damage to the towed vehicle similar to that of the commercial sling tow trucks, are not suitable for heavy duty towing, or incur stability problems in transit.

SUMMARY OF THE INVENTION

The present invention is directed toward overcoming one or more of the problems set forth above.

The present invention is useful with tow trucks of the type having a longitudinally extending frame with front and rear end portions, first and second ground engaging members, the first ground engaging member being connected to the frame front end portion and the second ground engaging member having an axle mounted from the rear end portion. The frame rear end portion of such tow trucks include a pair of opposed sidewalls longitudinally extending above and along a forward and a rearward side of the axle, and the sidewalls define an upper surface for the rear end portion of the frame.

The improvement of the present invention comprises a boom, means for telescopically extending and retracting the boom, means for bracing the sidewalls adjacent the rearward side of the axle and for permitting the boom to be positioned into a lowered position, and means for pivoting the boom between the lowered position and a raised position. The boom is pivotally connected to the frame at a boom forward end above the sidewall surfaces. The means for bracing and for permitting permits a rearward end of the boom to be adjacent the ground when the boom is extended and lowered.

Accordingly, the present invention is particularly suitable for performing a wheel-lift of a disabled vehicle, and also provides that the lifted load may be brought in close to the tow truck for improved stability during transit.

BRIEF DESCRIPTION OF THE DRAWINGS

Other objects of this invention will become apparent from the following description and accompanying drawings wherein.

DETAILED DESCRIPTION OF THE PREFERRED EMBODIMENTS

Figure 1:
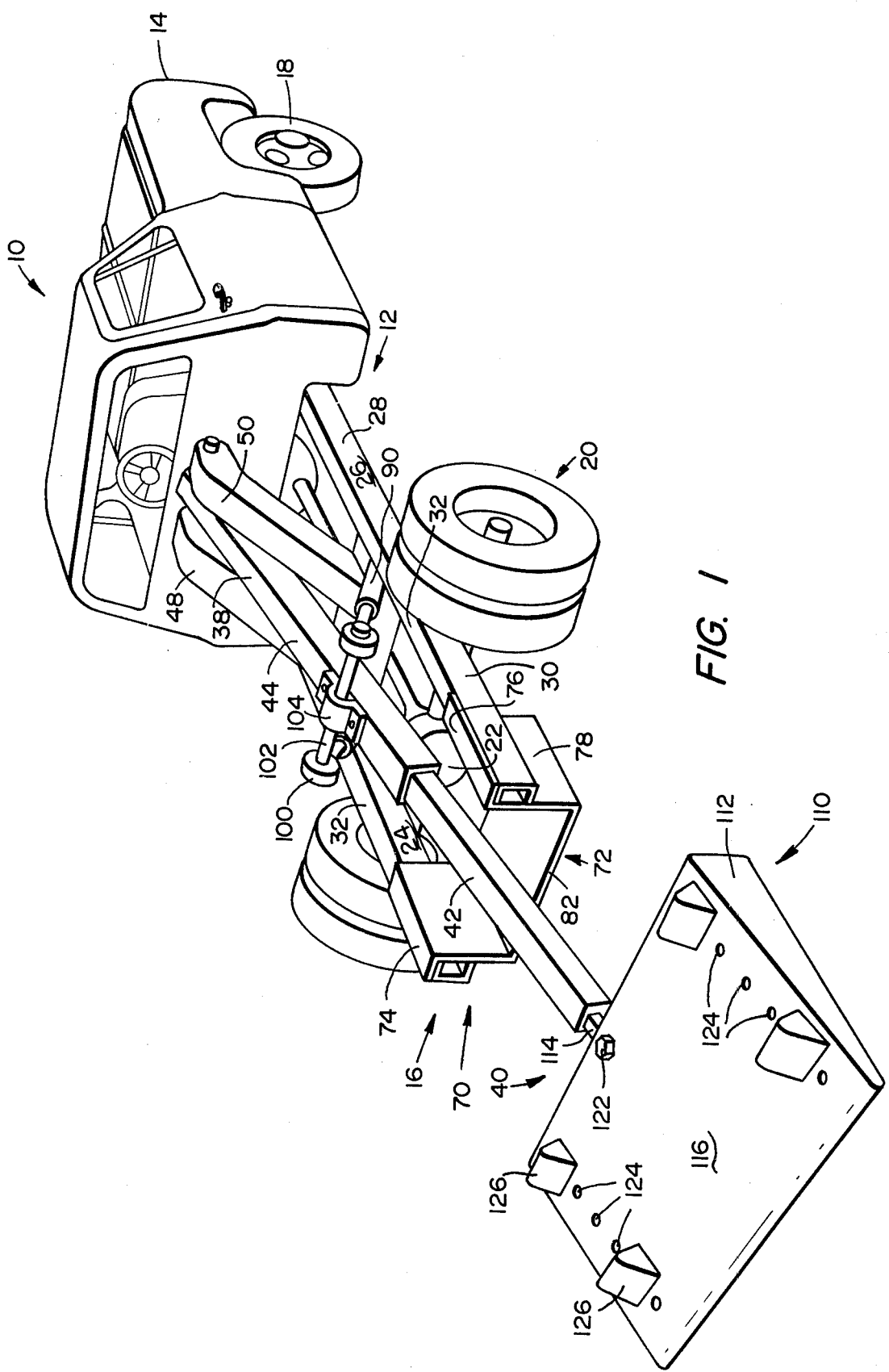
FIG. 1 is a perspective view of a lift truck incorporating the improvement of the present invention showing the boom extended and in the lowered position.

FIG. 1 illustrates a tow truck denominated generally as tow truck 10. The tow truck 10 is of the type having a longitudinally extending frame 12 with a front end portion 14 of the frame 12 and a rear end portion 16 of the frame 12. A first ground engaging member 18 is connected to the front end portion 14 of the frame 12 in a conventional manner, and is not hereinafter further discussed. A second ground engaging member 20 has an axle 22 conventionally mounted from the rear end portion 16 of the frame 12. The second ground engaging member 20 may be a pair of wheels, a double pair of wheels, or may be a tandem axle and wheel arrangement. The tow truck 10 herein illustrated has a double pair of wheels. The rear end portion 16 of the frame 12 includes a pair of opposed sidewalls 24,26 each of which longitudinally extend above and along a forward side 28 and a rearward side 30 of each of the sidewalls 24,26 with respect to the axle 22. The sidewalls 24,26 define an upper surface 32 for the rear end portion 16 of the frame 12. Extending between the sidewalls 24,26 at a spaced distance adjacent the forward side 28 is a crossbar member 34 (illustrated in FIG. 2).

Figure 2:
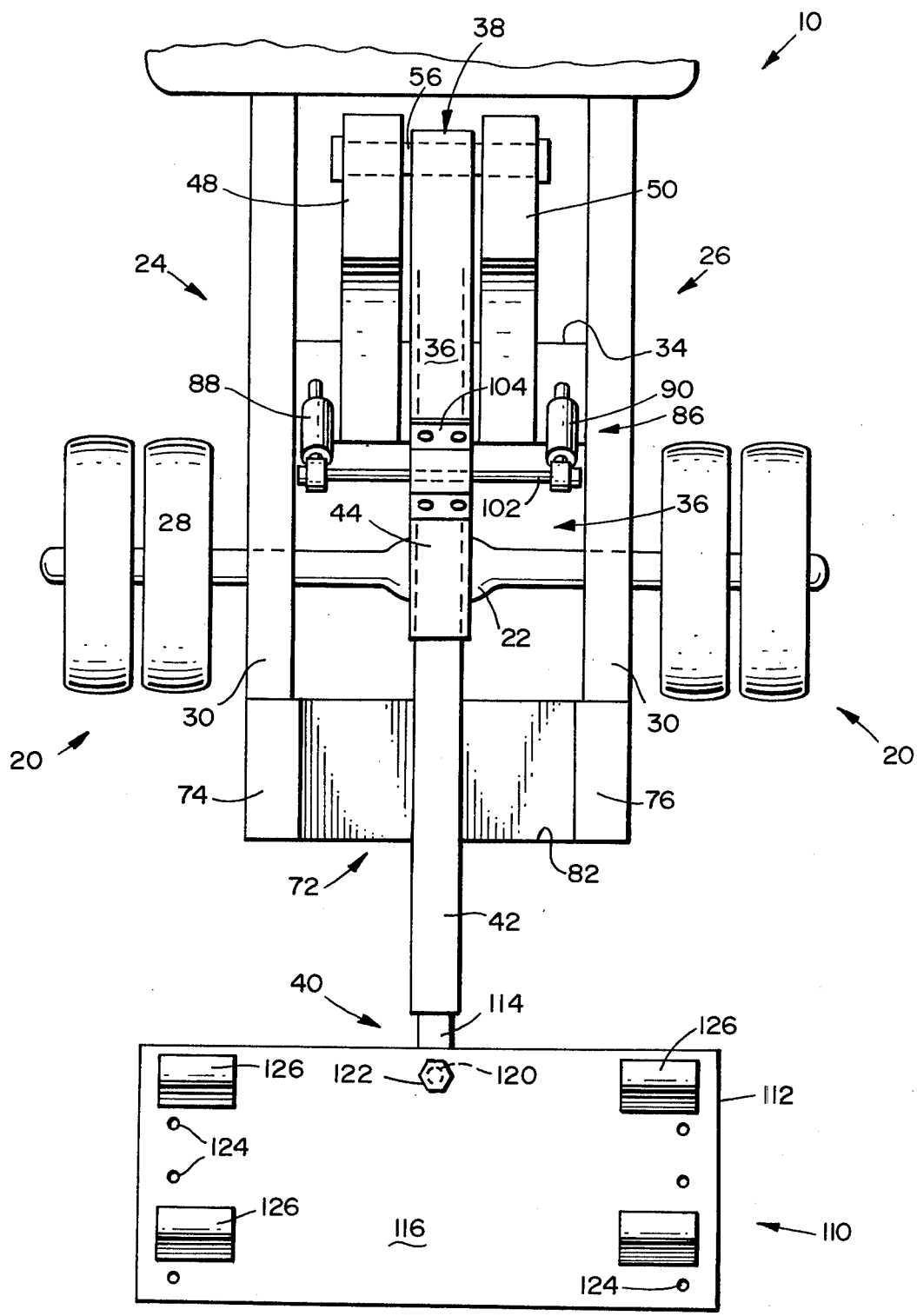
FIG. 2 is a plan view of the lift truck rear.

Turning to the invention, FIG. 2 illustrates a boom 36 which defines a forward end 38 and a rearward end 40. The boom 36 includes an inner member 42 and an outer member 44, the outer member 44 longitudinally extending rearwardly from the forward end 38, and the inner member 42 a longitudinal continuance of the boom 36 to the rearward end 40. The inner member 42 is telescopically slidable within the outer member 44 as further discussed hereinafter.

Figure 3:
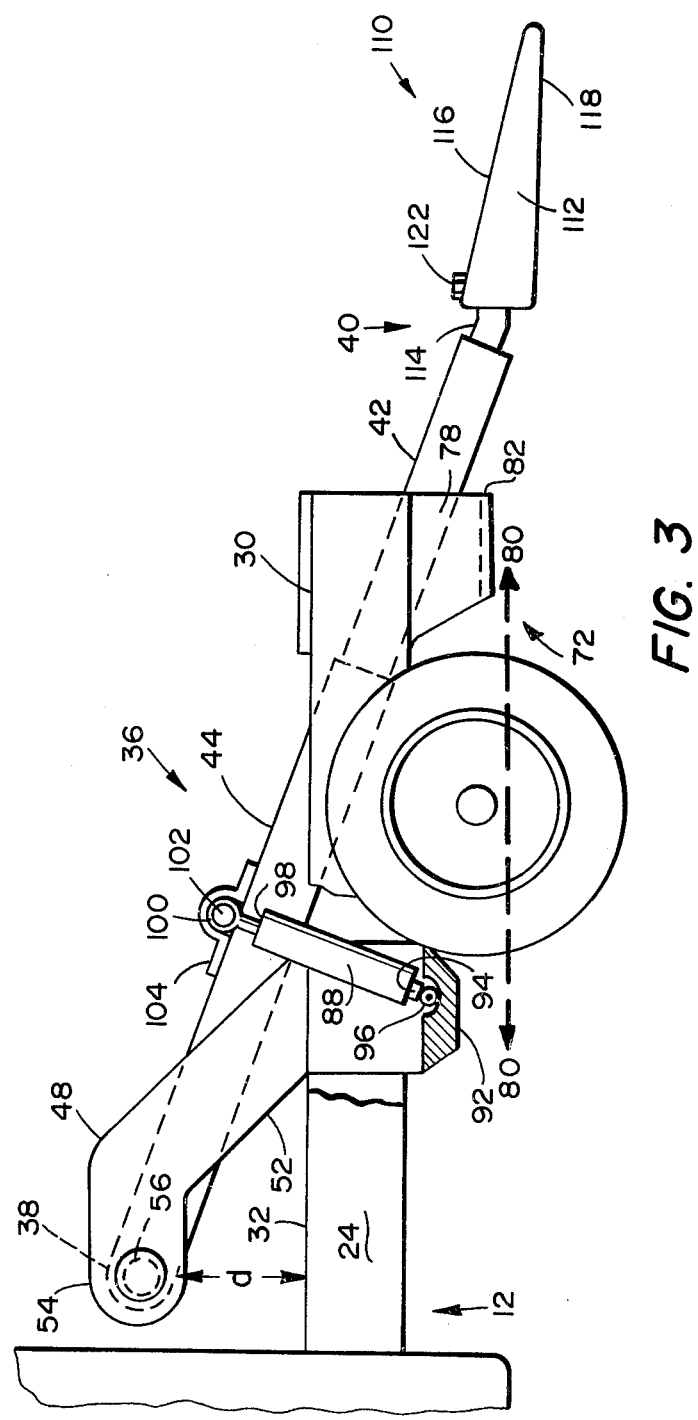
FIG. 3 is a side elevational view of FIG. 2 showing the boom partially extended and lowered; and, FIG. 4 is a side elevational view similar to that of FIG. 3 showing the boom in the retracted and in the raised position with a detail in cross-section, and further illustrating the manner in which the improved lift truck can tow a vehicle.

Referring to FIG. 3, the outer member 44 is pivotally connected to the frame 12 at the forward end 38 of the boom 36 a spaced distance d above the sidewall upper surfaces 32. The outer member 44 and frame 12 connection is a pair of stanchions 48,50.

The stanchions 48,50 (stanchion 48 being illustrated in FIG. 3 and being representative of both stanchions 48,50) is connected to the frame 12 (preferably, affixed to the crossbar member 34) at a lower end portion 52 of the stanchion 48. The stanchion 48 extends upwardly from the upper surfaces 32 and is preferably angled as illustrated. A second end portion 54 of the stanchion 48 carries a pivot pin 56 to which the forward end 38 of the boom 36 is connected for pivoting movement thereabout. The spaced distance d must be sufficient to provide that the forward end 38 of the boom 36 is held above the upper surface 32 of the sidewalls 24,26 to permit the rearward end 40 of the boom 36 to be pivoted into the lowered position, as hereinafter further described.

Figure 4:
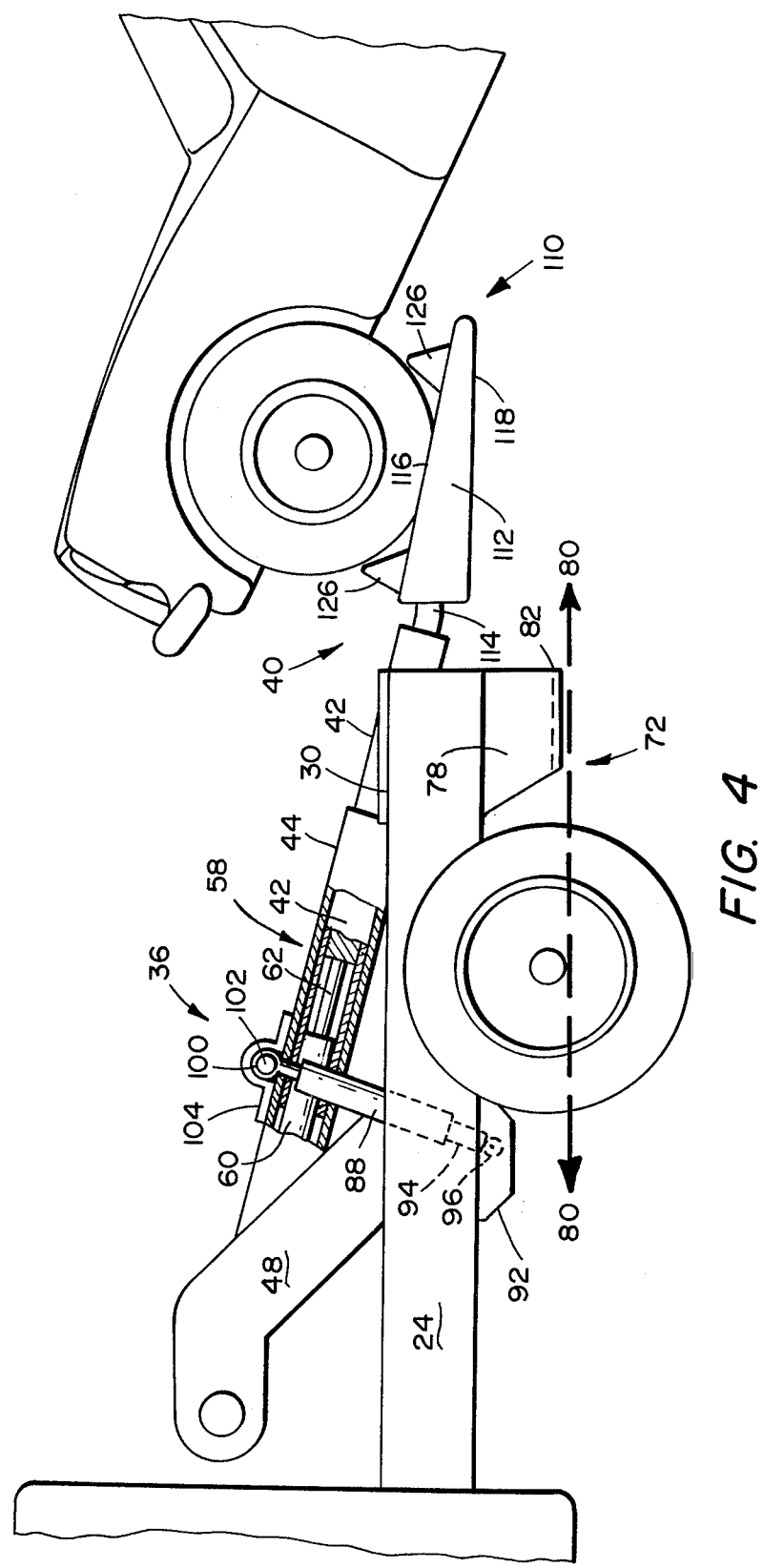

Turning to FIG. 4, the present invention further comprises a means 58 for telescopically extending and retracting the inner member 42 relative the outer member 44. The extending and retracting means 58 telescopically extends and retracts the inner member 42 slidably within the outer member 44. The extending and retracting means 58 may be a first hydraulic cylinder 60 which is mounted within the outer member 44. The first hydraulic cylinder 60 has a rearwardly extending piston rod 62 which is operatively associated by conventional linkages with the inner member 42, and the first hydraulic cylinder 60 may be operated by conventional conduit and value systems to control the flow of hydraulic fluid to and from the first hydraulic cylinder 60, and thus to extend and retract the inner member 42 relative the outer member 44. Such extension and retraction may be independent of the raising and lowering of the boom 36; however, under wheel-lift operating conditions the inner member 42 of the present invention will be substantially fully extended when the boom 36 is in the lowered position, as is illustrated by FIG. 1.

Referring to FIG. 1, the present invention must include a means 70 for bracing the sidewalls 24,26 and for permitting the boom 36 to be pivoted into the lowered position. The sidewalls 24,26 are preferably braced by the means 70 adjacent the rearward side 30 of the axle 22. The means 70 permits the rearward end 40 of the boom 36 to be adjacent the ground when the inner member 42 is fully extended.

The necessary bracing and permitting means 70 may be for example, a yoke structure 72. Referring to FIGS. 2-4, the yoke structure 72 has a pair of yoke end portions 74,76 each of which is fixedly attached, such as by welding or the like, to the rearward side 30 of a respective each of the sidewalls 24,26. Referring to FIGS. 3 and 4, the yoke structure 72 defines a cavity 78 which extends downwardly from the sidewalls 24,26 a distance to be at least about in a horizontal plane (illustrated by FIGS. 3 and 4 as broken line 80) of the axle 22. Such a downward extension of the cavity 78 is terminated by a tie-bar 82 being substantially transverse to the sidewalls 24,26, the tie-bar connecting between the yoke end portions 74,76.

A means 86 for pivoting the boom 36 between the fully lowered position (illustrated in FIG. 1 and illustrated as partially lowered in FIG. 3) and a raised position (illustrated in FIG. 4) is included for the improved tow truck 10. As illustrated by FIG. 2, the pivoting means 86 may be a pair of second hydraulic cylinders 88,90. Turning to FIG. 3, which illustrates the second hydraulic cylinder 88 and is representative of both hydraulic cylinders 88,90, the second hydraulic cylinder 88 is mounted upon the sidewall 24. Mounting may be via a plate 92 which is affixed to the forward side 28 of the sidewall 24, and which extends somewhat downwardly therefrom to allow an efficient stroke for the second cylinder 88. The second cylinder 88 includes a piston rod 94 connected by a rod eye 96 to the plate 92, and a piston head portion 98 connected by an eye 100 to the boom 36, or outer member 44. Connection to the boom 36 may be by a tie-rod 102 spanning between each of the second hydraulic cylinders 88,90 and affixed, such as by bracket 104, to the outer member 44.

The second hydraulic cylinders 88,90 are operated by conventional conduit and valve systems and the second cylinders 88,90 are preferably angled rearwardly as illustrated, the forwardly angled stanchions 48,50 and the rearwardly angled cylinders 88,90 co-operating to better distribute the weight and resist moments of force of a load lifted by the boom 36 upon the frame 12 of tow truck 10.

For load lifting operations, the improved tow truck 10 may include a means 110 for attaching a load to the rearward end 40 of the boom 36. The attaching means 110 may be a variety of conventional attaching means as are suitable for the type of load to be lifted and towed. For example, the attaching means 110 may be a conventional tow bar transverse to the boom 36. However, in the more preferred embodiment, the attaching means 110 is for attaching when the boom 36 is in the lowered position and the inner member 42 is extended so that the rearward end 40 is adjacent the ground. Thus, the tow truck is particularly suitable for a wheel-lift operation.

Accordingly, when the load to be lifted and towed is a vehicle such as a passenger vehicle, as illustrated by FIG. 4, the attaching means 110 may be a platform 112. The platform 112 is mounted upon the rearward end 40 of the boom 36 and extends transverse thereto. The mounting of platform 112 from rearward end 40 should be by a pivotal connection 114 of a construction sufficient to permit limited pivotal movement of platform 112 with respect to the rearward end 40 for turning during transit. Pivotal connection 114 may be, for example, where the rearward end 40 of boom 36 may be received between an upper surface 116 and a lower surface 118 of platform 112, a substantially vertically extending bore 120 is defined in upper and lower surfaces 116,118 and the rearward end 40, and a bolt 122 is insertable and fastened into the bore 120.

The platform 112 is of a construction sufficient to support a load thereupon, such as where the upper surface 116 is sufficient to support the front or rear wheels of a vehicle.

Referring to FIG. 2, the upper surface 116 may include apertures 124. Referring to FIG. 4, the apertures 124 are adapted to receive chocks 126 or the like for blocking the wheels of a towed vehicle against longitudinal movement during acceleration and deceleration. The upper surface 116 preferably is downwardly inclined toward the ground to assist in providing easy loading of the vehicle upon platform 112.

The improved tow truck 10 as above described is particularly useful as a specialized truck for towing passenger cars and other wheeled vehicles. When travelling to a stalled vehicle, the improved tow truck 10 will normally have the boom 36 in the raised, retracted position. When the improved tow truck 10 is backed up to either the front or rear of the disabled vehicle, the boom 36 may be lowered. Where the improved tow truck 10 is used for a wheel-lift, for example by including the preferred platform 112, the lowered boom 36 is extended to wedge the platform 112 beneath the front or rear wheels of the disabled vehicle which may then be easily urged up the inclination of upper surface 116. The wheels may be blocked thereupon, and the boom 36 pivoted upwardly to lift the disabled vehicle. The extending and retracting means 46 and the boom 36 co-operate to retract the inner member 42 of the boom 36 inwardly with respect to the outer member 44 until the platform 112 is brought closely adjacent to the rear end portion 16 of the frame 12 (illustrated by FIG. 4).

Accordingly, the inner and outer members 42,44 of the boom 36 together function as a load arm for the lifting of the load, and the load is well distributed to the frame 12 along the forward side 28 of the axle 22. Further, as the load may be brought close in to the rear of the tow truck, the improved tow truck 10 provides excellent stability of the lifted load during transit.

Other aspects, objectives, and advantages of this invention can be obtained from a study of the drawings, the disclosure and the appended claims.

That which is claimed is:

1. In a tow truck of the type having a longitudinally extending frame with front and rear end portions, first and second ground engaging members, the first ground engaging member being connected to the frame front end portion and the second ground engaging member having an axle mounted from the rear portion, the frame rear end portion including a pair of opposed sidewalls longitudinally extending above and along a forward and a rearward side of the axle, the sidewalls defining an upper surface for the rear end portion, the improvement comprising:

a boom defining a forward end and a rearward end, the boom including an inner and an outer member, the inner member being slidable within the outer member, the outer member being pivotally connected to the frame at the boom forward end and defining a pivot point for the boom above the sidewall upper surfaces;

means for slidably moving and pivoting the boom between a first position and a second position, the rearward end of the boom being a first distance from the pivot point and adjacent the ground in the first position, the rearward end of the boom being a second distance from the pivot point, raised above the ground and closely adjacent said sidewall upper surfaces in the second position, the second distance being less than the first distance; and, means for bracing the sidewalls adjacent the rearward side of the axle and for permitting the boom to be pivoted between the first and second positons.

2. A tow truck as in claim 1 further comprising:

means for attaching the rearward end of the boom to wheels of a vehicle when the boom is in the first position.

3. The improved tow truck as in claim 2 wherein:

the means for attaching includes a platform, the platform being mounted upon the boom rearward end and extending transverse thereto, the platform being of a construction sufficient to lift a vehicle from around wheels thereof when said boom is slidably moved and pivoted between the first position and the second position.

4. The improved tow truck as in claim 3 wherein:

the means for slidably moving and pivoting and the boom together are adapted to retract the inner member of the boom a sufficient distance inwardly of the outer member to bring the platform adjacent the frame sidewalls along the rearward side of the axle when the boom is in the second position.

5. The improved tow truck as in claims 1 or 2 wherein:

the means for bracing and for permitting includes a yoke structure, the yoke structure having a pair of yoke end portions connected between a tie-bar, the tie-bar defining a cavity between the yoke end portion, each of the yoke end portions fixedly attached to a respective each of the sidewalls, the cavity extending downwardly from the sidewalls a distance to be at least about in a horizontal plane of the axle.

6. An improved tow truck as in claim 4 wherein:

the means for slidably moving and pivoting includes a first hydraulic cylinder mounted within the outer member of the boom; and, the outer member is pivotally connected to the frame adjacent the forward side of the axle, the inner and outer members together being a load arm for the boom.

7. The improved tow truck as in claim 6 wherein:

the means for slidably moving and pivoting includes a pair of second hydraulic cylinders, the second cylinders mounted on a respective each of the frame sidewalls, the mounting at a first end of the second cylinders adjacent the forward side of the axle, a second end of the second cylinders connected to the outer member of the boom.

* * * * *

UNITED STATES PATENT AND TRADEMARK OFFICE
CERTIFICATE OF CORRECTION

PATENT NO. : 4,264,262
DATED : April 28, 1981
INVENTOR(S) : JAMES M. LO CODO

It is certified that error appears in the above-identified patent and that said Letters Patent are hereby corrected as shown below:

Column 1, line 46, change "structure" to --structures--.

Column 6, line 17, change "4" to --7--.

Column 6, line 35, change "6" to --5--.

Column 6, line 43, change "7" to --6--.

Signed and Sealed this

Eleventh Day of August 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,264,262
DATED : April 28, 1981
INVENTOR(S) : James M. Lo Codo

It is certified that error appears in the above—identified patent and that said Letters Patent is hereby corrected as shown below:

Column 6, Line 43, delete the "6" between the words "claim" and "wherein" and replace with --5--.

Signed and Sealed this

Tenth Day of November 1981

[SEAL]

*Attest:*

*Attesting Officer*

GERALD J. MOSSINGHOFF

*Commissioner of Patents and Trademarks*

UNITED STATES PATENT AND TRADEMARK OFFICE
CERTIFICATE OF CORRECTION

PATENT NO. : 4,264,262
DATED : April 28, 1981
INVENTOR(S) : James M. Lo Codo

It is certified that error appears in the above—identified patent and that said Letters Patent is hereby corrected as shown below:

Column 6, Line 24, change "5" to --4--.

Signed and Sealed this

Sixteenth Day of February 1982

[SEAL]

Attest:

GERALD J. MOSSINGHOFF

Attesting Officer

Commissioner of Patents and Trademarks